United States Patent
Ebato et al.

(10) Patent No.: US 12,009,561 B2
(45) Date of Patent: Jun. 11, 2024

(54) METHOD OF PRODUCING FUEL CELL STACK

(71) Applicant: HONDA MOTOR CO., LTD., Tokyo (JP)

(72) Inventors: Yutaka Ebato, Wako (JP); Satoshi Oyama, Wako (JP); Takaaki Mitsuoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 4 days.

(21) Appl. No.: 18/111,665

(22) Filed: Feb. 20, 2023

(65) Prior Publication Data
US 2023/0290982 A1      Sep. 14, 2023

(30) Foreign Application Priority Data

Mar. 10, 2022   (JP) ................................. 2022-036786

(51) Int. Cl.
| | |
|---|---|
| *H01M 8/1004* | (2016.01) |
| *H01M 8/0258* | (2016.01) |
| *H01M 8/0286* | (2016.01) |
| *H01M 8/10* | (2016.01) |

(52) U.S. Cl.
CPC ....... *H01M 8/1004* (2013.01); *H01M 8/0258* (2013.01); *H01M 8/0286* (2013.01); *H01M 2008/1095* (2013.01)

(58) Field of Classification Search
CPC ............ H01M 8/1004; H01M 8/0258; H01M 8/0286; H01M 2008/1095; H01M 8/0206; H01M 8/0247; H01M 8/0271; H01M 8/0276; H01M 8/0297; H01M 8/0273; H01M 8/242; H01M 8/248; H01M 8/2404; H01M 8/241; Y02E 60/50; Y02P 70/50

See application file for complete search history.

(56) References Cited

U.S. PATENT DOCUMENTS

| | | | | |
|---|---|---|---|---|
| 2004/0110057 | A1* | 6/2004 | Yoshimoto | H01M 8/2457 429/437 |
| 2015/0303494 | A1* | 10/2015 | Shibata | H01M 8/2457 429/479 |
| 2016/0133948 | A1* | 5/2016 | Fukuyama | H01M 8/0206 429/465 |
| 2020/0335810 | A1* | 10/2020 | Ohmori | H01M 8/248 |
| 2020/0381759 | A1 | 12/2020 | Kajiwara et al. | |
| 2022/0013795 | A1 | 1/2022 | Namba et al. | |

FOREIGN PATENT DOCUMENTS

| | | |
|---|---|---|
| JP | 2020-198200 A | 12/2020 |
| JP | 2021-125329 A | 8/2021 |
| JP | 2022-022802 A | 2/2022 |
| WO | 2015/011989 A1 | 1/2015 |

* cited by examiner

*Primary Examiner* — Muhammad S Siddiquee
(74) *Attorney, Agent, or Firm* — Carrier, Shende & Associates P.C.; Joseph P. Carrier; Fulchand P. Shende

(57) ABSTRACT

A method of producing the fuel cell stack, including: a stacking step of stacking a plurality of power generation cells each including a membrane electrode assembly, a pair of separator plates sandwiching the membrane electrode assembly, and a seal member; and a compressing step of applying a compression load to the plurality of power generation cells stacked. In the compressing step, the compression load is applied in a manner that the membrane electrode assembly is plastically deformed, without exceeding an elastic limit of the seal member.

2 Claims, 8 Drawing Sheets

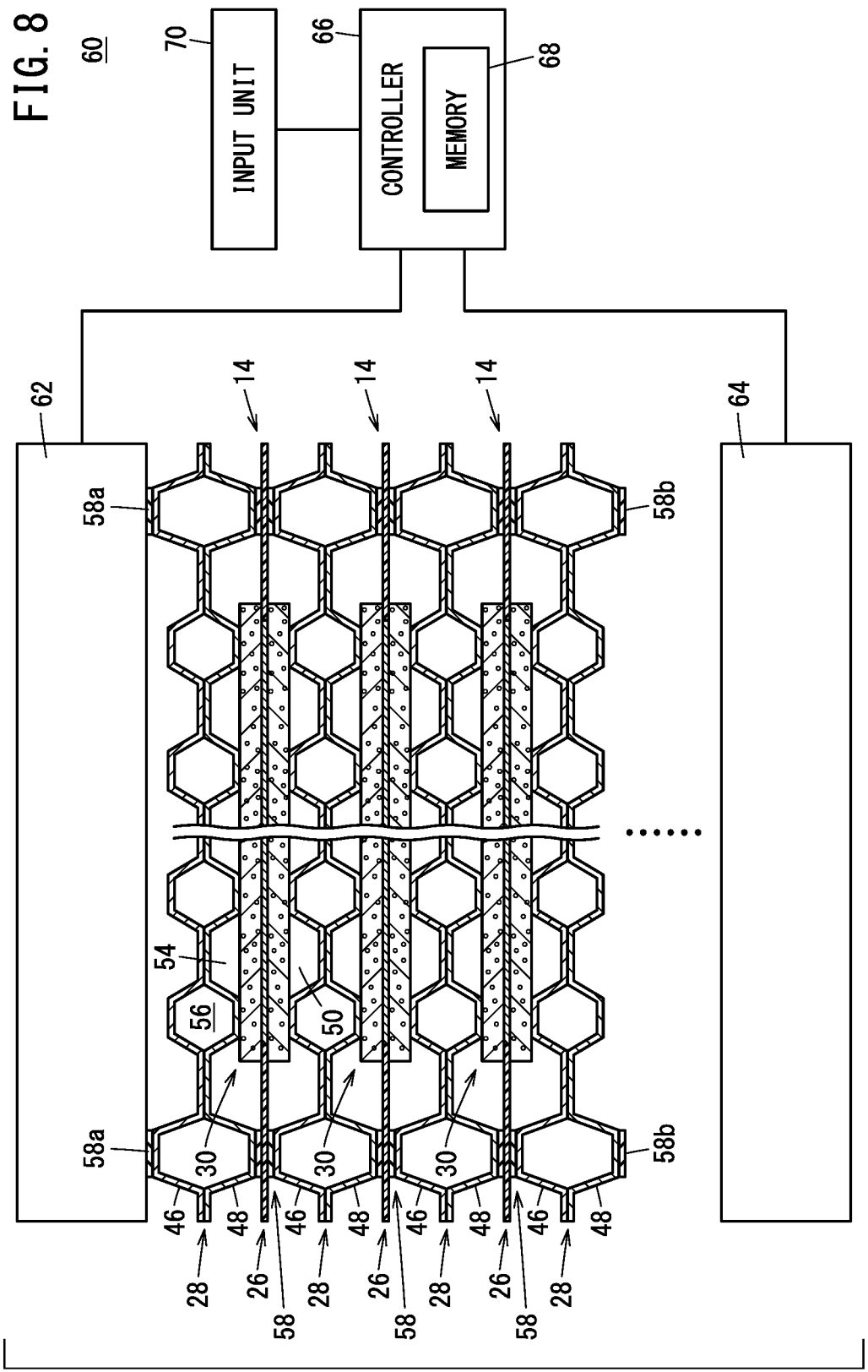

METHOD OF PRODUCING FUEL CELL STACK

CROSS-REFERENCE TO RELATED APPLICATIONS

This application is based upon and claims the benefit of priority from Japanese Patent Application No. 2022-036786 filed on Mar. 10, 2022, the contents of which are incorporated herein by reference.

BACKGROUND OF THE INVENTION

Field of the Invention

The present invention relates to a method of producing a fuel cell stack.

Description of the Related Art

In recent years, research and development have been conducted on fuel cell stacks that contribute to energy efficiency in order to ensure that more people have access to affordable, reliable, sustainable and modern energy.

JP 2022-022802 A discloses a method of producing a fuel cell stack. In the fuel cell stack disclosed in JP 2022-022802 A, a plurality of power generation cells are stacked. The power generation cell includes a membrane electrode assembly, and a first metal separator and a second metal separator sandwiching the membrane electrode assembly. The first metal separator and the second metal separator are provided with beads (bead seals) protruding toward the membrane electrode assembly. A seal member is disposed on tops of the beads.

In the production method disclosed in JP 2022-022802 A, after the plurality of power generation cells are stacked, a pressure medium is supplied to a coolant flow field formed by the first metal separator and the second metal separator. This pressure medium brings the seal member into close contact with a resin frame of the membrane electrode assembly.

SUMMARY OF THE INVENTION

However, there is a variation in thickness of the membrane electrode assemblies of respective power generation cells to be stacked. A large variation in thickness may create a concern of decrease in the power generation efficiency.

An object of the present invention is to solve the aforementioned problem.

According to an aspect of the present invention, there is provided a method of producing a fuel cell stack, comprising: a stacking step of stacking a plurality of power generation cells each including a membrane electrode assembly, a pair of separator plates sandwiching the membrane electrode assembly, and a seal member; and a compressing step of applying a compression load to the plurality of power generation cells stacked in the stacking step, wherein the separator plates respectively comprise: fluid flow field portions facing the membrane electrode assembly and configured to allow fluids to flow in a surface direction of the separator plates; and beads surrounding the fluid flow field portions and protruding at portions outside the membrane electrode assembly in a thickness direction of the separator plates, the seal member is provided between the beads of the pair of separator plates, an elastic limit of the seal member is greater than an elastic limit of the membrane electrode assembly, and in the compressing step, the compression load is applied in a manner that the membrane electrode assembly is plastically deformed, without exceeding the elastic limit of the seal member.

According to the aspect of the present invention, it is possible to suppress variation in thickness of the membrane electrode assemblies of respective power generation cells from increasing. As a result, it is possible to suppress decrease in power generation efficiency, thereby contributing to energy efficiency. In addition, an overload from the power generation cells can be prevented. As a result, the strength of the stack case can be suppressed, and the entire fuel cell stack can be made light in weight and small in size.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a diagram illustrating a configuration of a tool.

DETAILED DESCRIPTION OF THE INVENTION

Figure 1:
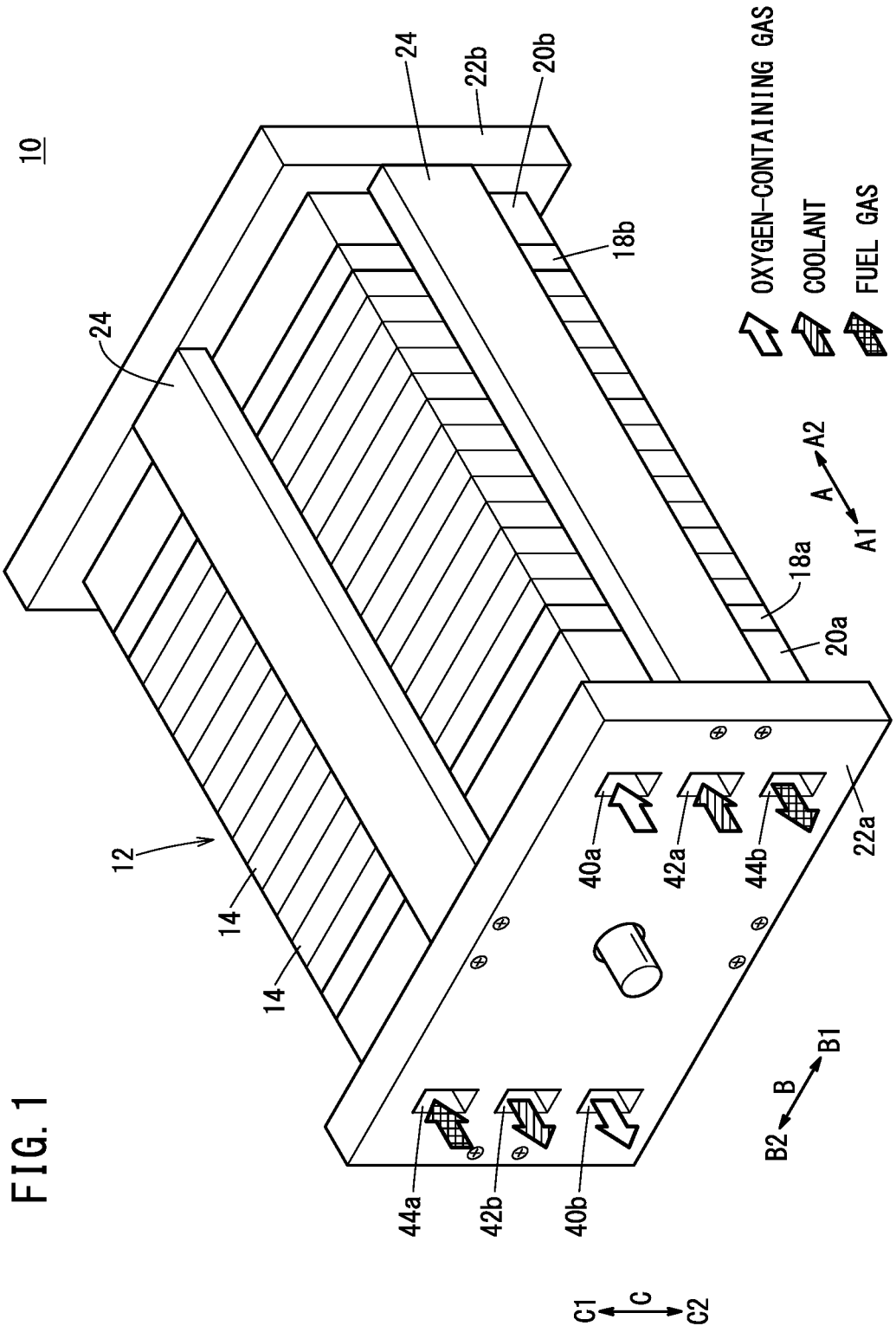
FIG. 1 is a perspective view of the fuel cell stack.

FIG. 1 is a perspective view of the fuel cell stack 10. The fuel cell stack 10 may be mounted on a vehicle such as an electric vehicle (not shown), or may be used as a stationary type. The fuel cell stack 10 includes a power generation cell stack body 12. The power generation cell stack body 12 is formed by stacking a plurality of power generation cells 14 in a stacking direction (direction indicated by an arrow A). At one end of the power generation cell stack body 12 in the stacking direction (end in a direction indicated by an arrow A1), a terminal plate 18a is provided. An insulator 20a is provided outside the terminal plate 18a, and an end plate 22a is provided outside the insulator 20a. At the other end of the power generation cell stack body 12 in the stacking direction (end in a direction indicated by an arrow A2), a terminal plate 18b is provided. An insulator 20b is provided outside the terminal plate 18b, and an end plate 22b is provided outside the insulator 20b.

The insulators 20a, 20b are formed by an insulating material, for example, polycarbonate (PC), phenol resin, or the like. It should be noted that each of the insulator 20a, 20b is made up of a plurality of (e.g., two) insulators stacked together in the stacking direction.

Coupling bars 24 are arranged between respective inner sides of the end plates 22a, 22b. Both ends of the respective coupling bars 24 are fixed via bolts or the like to inner surfaces of the end plates 22a, 22b, so as to apply a compression load (fastening load) to the power generation cell stack body 12 in the stacking direction. The fuel cell stack 10 may be equipped with a casing in which the end plates 22a, 22b are provided as end plates thereof, and a structure may be provided in which the power generation cell stack body 12 is accommodated inside the casing.

Figure 2:
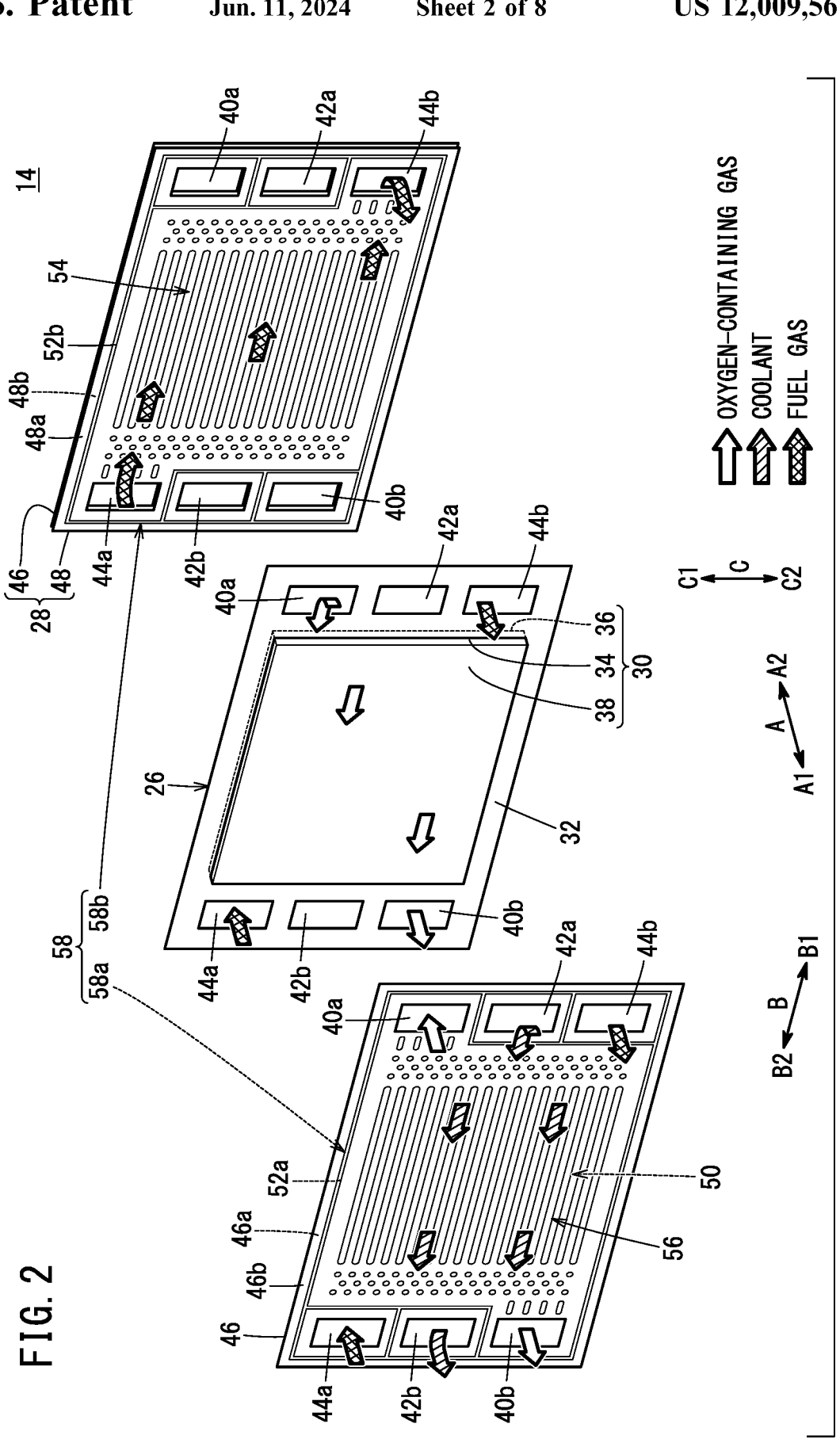
FIG. 2 is an exploded perspective view of the power generation cell.

As shown in FIG. 2, the power generation cell 14 includes a resin-framed MEA 26 and separators 28. The resin-framed MEA 26 includes a membrane electrode assembly 30 and a resin frame member 32 surrounding the outer periphery of the membrane electrode assembly 30.

The membrane electrode assembly 30 has an electrolyte membrane 34, an anode 36 provided on one surface of the electrolyte membrane 34 (on the arrow A2 side), and a cathode 38 provided on the other surface of the electrolyte membrane 34 (on the arrow A1 side).

The electrolyte membrane 34, for example, is a solid polymer electrolyte membrane (cation ion exchange membrane), which is formed by impregnating a thin membrane of perfluorosulfonic acid with water, and sandwiched between the anode 36 and the cathode 38. As the electrolyte membrane 34, an HC (hydrocarbon) based electrolyte may be used in addition to the fluorine-based electrolyte.

The anode 36 includes an anode catalyst layer (not shown) and an anode gas diffusion layer (not shown). The anode catalyst layer is joined to one surface of the electrolyte membrane 34 (on the arrow A2 side). The anode gas diffusion layer is stacked on the anode electrode catalyst layer. The cathode 38 includes a cathode catalyst layer (not shown) and a cathode gas diffusion layer (not shown). The cathode catalyst layer is joined to the other surface of the electrolyte membrane 34 (on the arrow A1 side). The cathode gas diffusion layer is stacked on the cathode electrode catalyst layer.

The anode catalyst layer is formed by depositing porous carbon particles uniformly on the surface of the anode gas diffusion layer together with ion conductive polymer binder, and platinum alloy is supported on surfaces of the carbon particles. The cathode catalyst layer is formed by depositing porous carbon particles uniformly on the surface of the cathode gas diffusion layer together with ion conductive polymer binder, and platinum alloy is supported on surfaces of the carbon particles.

Each of the cathode gas diffusion layer and the anode gas diffusion layer is in the form of an electrically conductive porous sheet such as a carbon paper or a carbon cloth. A porous layer (not shown) may be provided at least one of positions between the cathode catalyst layer and the cathode gas diffusion layer and between the anode catalyst layer and the anode gas diffusion layer.

The resin frame member 32 is frame-shaped and the inner peripheral edge portion thereof is joined, for example, to the outer peripheral edge portion of the membrane electrode assembly 30. As described above, by providing the resin frame member 32 for the membrane electrode assembly 30, it is possible to reduce the area of the relatively expensive electrolyte membrane 34 needed for forming one power generation cell 14.

Although not particularly limited thereto, in an example of the joint structure of joining the resin frame member 32 and the membrane electrode assembly 30 together, an inner marginal end portion of the resin frame member 32 may be held between an outer marginal end portion of the cathode gas diffusion layer and an outer marginal end portion of the anode gas diffusion layer. In this case, the inner peripheral end surface of the resin frame member 32 may be close to, in contact with, or overlapped with the outer peripheral end surface of the electrolyte membrane 34.

Instead of the above-described joint structure, the resin frame member 32 may be configured such that the outer peripheral edge portion of the electrolyte membrane 34 protrudes outward from the cathode gas diffusion layer and the anode gas diffusion layer, and a frame-shaped film is provided on both sides of the outer peripheral edge portion of the electrolyte membrane 34. That is, the resin frame member 32 may be formed by bonding a plurality of stacked frame-shaped films with an adhesive or the like.

As shown in FIGS. 1 and 2, at one end of each of the power generation cells 14, the end plates 22a, 22b, the insulators 20a, 20b in a long side direction (end in a direction indicated by an arrow B1), an oxygen-containing gas supply passage 40a, a coolant supply passage 42a, and a fuel gas discharge passage 44b are arranged in the direction indicated by an arrow C. At the other end of each of the power generation cells 14, the end plates 22a, 22b, the insulators 20a, 20b in the longitudinal direction (end in a direction indicated by an arrow B2), a fuel gas supply passage 44a, a coolant discharge passage 42b, and an oxygen-containing gas discharge passage 40b are arranged in the direction indicated by the arrow C.

An oxygen-containing gas is supplied to the oxygen-containing gas supply passage 40a. A coolant (e.g., any of pure water, ethylene glycol, and oil) is supplied to the coolant supply passage 42a. A fuel gas such as a hydrogen-containing gas is discharged from the fuel gas discharge passage 44b. The fuel gas is supplied to the fuel gas supply passage 44a. The coolant is discharged from the coolant discharge passage 42b. The oxygen-containing gas is discharged from the oxygen-containing gas discharge passage 40b.

The oxygen-containing gas supply passage 40a is in fluid communication with each of the power generation cells 14 of the power generation cell stack body 12, the end plates 22a, 22b and the insulators 20a, 20b in the stacking direction. That is, the oxygen-containing gas supply passage 40a extends through the end plate 22a, the insulators 20a, 20b, and the power generation cell stack body 12 in the stacking direction. Likewise, each of the coolant supply passage 42a, the fuel gas discharge passage 44b, the fuel gas supply passage 44a, the coolant discharge passage 42b, the oxygen-containing gas discharge passage 40b also extends through the end plates 22a, 22b, the insulators 20a, 20b, the power generation cell stack body 12 in the stacking direction.

In the embodiment of the present invention, an example is shown in which each of the power generation cells 14 has one oxygen-containing gas supply passage 40a, one coolant supply passage 42a, one fuel gas discharge passage 44b, one fuel gas supply passage 44a, one coolant discharge passage 42b, and one oxygen-containing gas discharge passage 40b (hereinafter also referred to as the "fluid passages", collectively). However, the number of fluid passages provided for the power generation cell 14 is not limited. One or a plurality of fluid passages may be provided for the power generation cell 14. Further, the shape and the layout of each of the fluid passages are not limited to those of the embodiment of the present invention, depicted in FIGS. 1 and 2, and may be determined as necessary depending on the required specification.

As shown in FIG. 2, the separator 28 has a rectangular shape including a pair of long sides opposed to each other in the arrow C direction and a pair of short sides opposed to each other in the arrow B direction. The separator 28 is formed by integrally joining the outer peripheries of the separator plates 46, 48. Welding, brazing, caulking, or the like is used for this joining. Hereinafter, the separator plate 46 is referred to as a first separator plate 46. The separator plate 48 is referred to as a second separator plate 48.

Each of the first separator plate 46 and the second separator plate 48, for example, is made of a metal plate such as a steel plate, a stainless steel plate, an aluminum plate, a plated steel sheet, a titanium plate or a metal plate having anti-corrosive surfaces produced by performing a surface treatment. The first separator plate 46 and the second separator plate 48 are formed in wavy shapes by press molding. It should be noted that insulating resin material may be provided on the outer marginal portion of the separator 28.

The first separator plate 46 and the second separator plate 48 incorporated in the power generation cell stack body 12 as the separator 28 respectively have MEA side surfaces 46a, 48a facing the resin-framed MEA 26 and coolant side surfaces 46b, 48b on the rear surfaces thereof.

A plurality of ridges are provided on the MEA side surface 46a of the first separator plate 46. The ridges extend straight in the arrow B direction. A fluid flow field portion 50 is formed of grooves extending straight between the ridges. The ridges and the grooves in the fluid flow field portion 50 may be wavy. Hereinafter, the fluid flow field portion 50 is referred to as an oxygen-containing gas flow field portion 50. The oxygen-containing gas flow field portion 50 faces the cathode 38 of the MEA 30 and is in fluid communication with the oxygen-containing gas supply passage 40a and the oxygen-containing gas discharge passage 40b. The oxygen-containing gas flow field portion 50 allows the fluid (oxygen-containing gas) to flow in the surface direction (the directions indicated by the arrows B and C) of the separator 28.

Further, a bead 52a is integrally provided on the MEA side surface 46a of the first separator plate 46 by press forming or the like. The bead 52a protrudes toward the resin-framed MEA 26 in the thickness direction of the first separator plate 46.

The bead 52a is disposed outside the membrane electrode assembly 30. The bead 52a surrounds the oxygen-containing gas flow field portion 50, the oxygen-containing gas supply passage 40a, and the oxygen-containing gas discharge passage 40b all together. In this manner, the bead 52a allows communication among the oxygen-containing gas flow field portion 50, the oxygen-containing gas supply passage 40a, and the oxygen-containing gas discharge passage 40b. Further, the beads 52a surround the fuel gas supply passage 44a, the fuel gas discharge passage 44b, the coolant supply passage 42a, and the coolant discharge passage 42b, individually. Thus, the beads 52a prevent the fuel gas and the coolant from flowing into the oxygen-containing gas flow field portion 50.

A plurality of ridges are provided on the MEA side surface 48a of the second separator plate 48. The ridges extend straight in the arrow B direction. A fluid flow field portion 54 is formed of grooves extending straight between the ridges. The ridges and the grooves in the fluid flow field portion 54 may be wavy. Hereinafter, the fluid flow field portion 54 is referred to as a fuel gas flow field portion 54. The fuel gas flow field portion 54 faces the anode 36 of the membrane electrode assembly and communicates fluidically with the fuel gas supply passage 44a and the fuel gas discharge passage 44b. The fuel gas flow field portion 54 allows the fluid (fuel gas) to flow in the surface direction (the directions indicated by the arrows B and C) of the separator 28.

Further, a bead 52b is integrally provided on the MEA side surface 48a of the second separator plate 48 by press forming or the like. The bead 52b protrudes toward the resin-framed MEA 26 in the thickness direction of the second separator plate 48.

The bead 52b is disposed outside the membrane electrode assembly 30. The bead 52b surrounds the fuel gas flow field portion 54, the fuel gas supply passage 44a, and the fuel gas discharge passage 44b all together. In this manner, the bead 52b allows communication among the fuel gas flow field portion 54, the fuel gas supply passage 44a, and the fuel gas discharge passage 44b. Further, the beads 52b surround the oxygen-containing gas supply passage 40a, the oxygen-containing gas discharge passage 40b, the coolant supply passage 42a, and the coolant discharge passage 42b, individually. Thus, the bead 52b prevents the oxygen-containing gas and the coolant from flowing into the fuel gas flow field portion 54.

The fluid flow field portion 56 is provided between a surface 46b of the first separator plate 46 along which the coolant flows and a surface 48b of the second separator plate 48 along which the coolant flows, the surfaces 46b, 48b facing each other. Hereinafter, the fluid flow field portion 56 is referred to as a coolant flow field portion 56. The coolant flow field portion 56 is connected to (in fluid communication with) the coolant supply passage 42a and the coolant discharge passage 42b. Thus, the coolant flow field portion 56 allows the coolant to flow in the surface direction of the separator 28 (the arrows B and C directions).

The coolant flow field portion 56 is formed by overlapping and matching together the rear surface shape of the MEA side surface 46a of the first separator plate 46 on which the oxygen-containing gas flow field portion 50 is formed, and the rear surface shape of the MEA side surface 48a of the second separator plate 48 on which the fuel gas flow field portion 54 is formed. In the surfaces 46b, 48b of the first separator plate 46 and the second separator plate 48 facing each other to allow the coolant to flow along, the peripheries of the passages are welded or brazed to each other.

A seal member 58 is provided between the bead 52a (see FIG. 2) of the first separator plate 46 of one of the pair of separators 28 and the bead 52b (see FIG. 2) of the second separator plate 48 of the other of the pair of separators 28.

Figure 3:
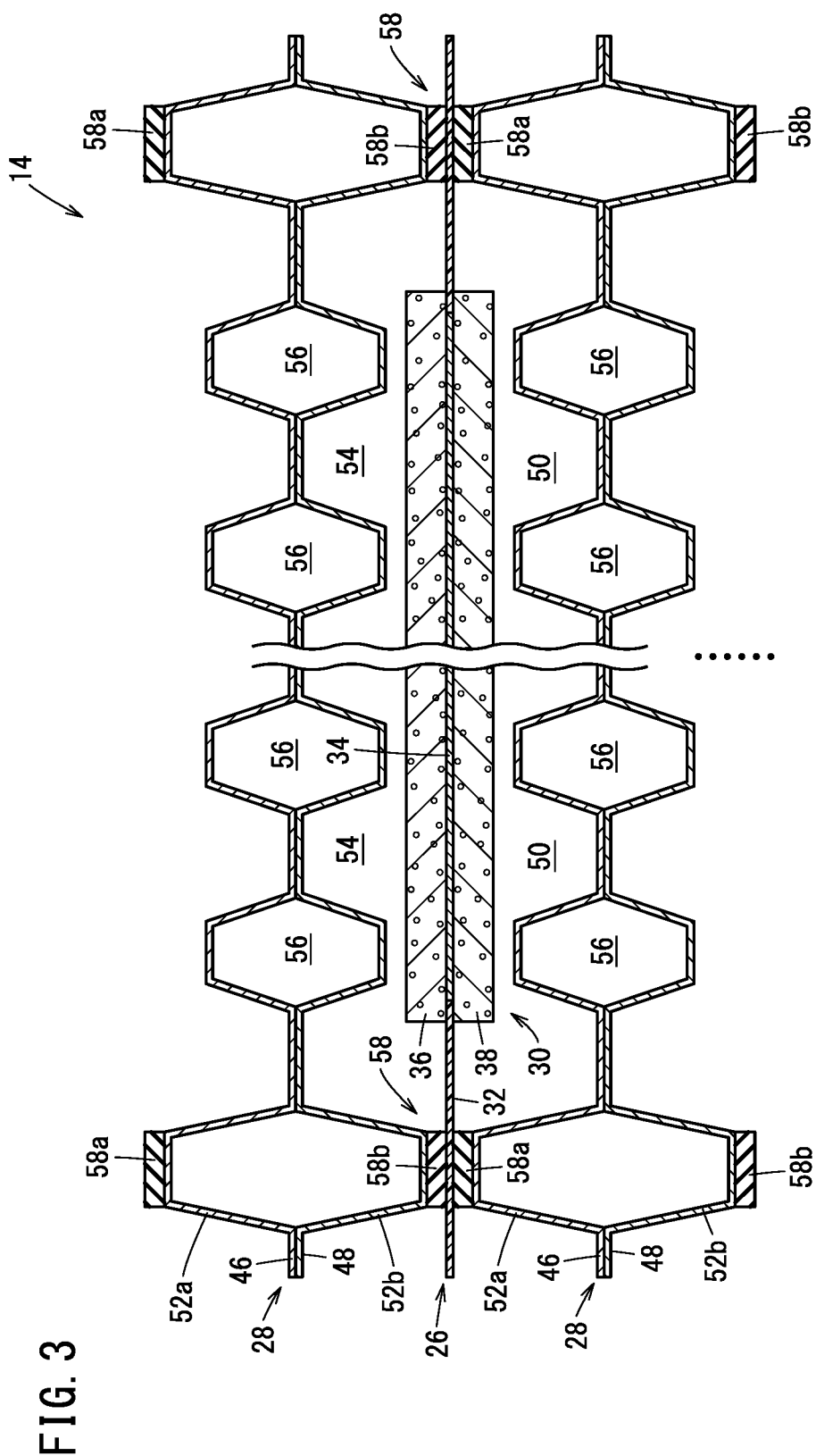
FIG. 3 is a view illustrating a cross section of the power generation cell.

As shown in FIG. 3, the seal member 58 includes a seal member 58a and a seal member 58b. The seal member 58a is attached to a top of the bead 52a. The seal member 58a may be bonded to the top of the bead 52a. Alternatively, the seal member 58a may be fitted into a groove or the like formed at the top of the bead 52a.

The seal member 58b is attached to a top of the bead 52b. The seal member 58b may be bonded to the top of the bead 52b. Alternatively, the seal member 58b may be fitted into a groove or the like formed at the top of the bead 52b. The seal member 58a and the seal member 58b are pressed against the resin frame member 32 to prevent leakage of the fluid (oxygen-containing gas, fuel gas, or coolant).

Figure 4:
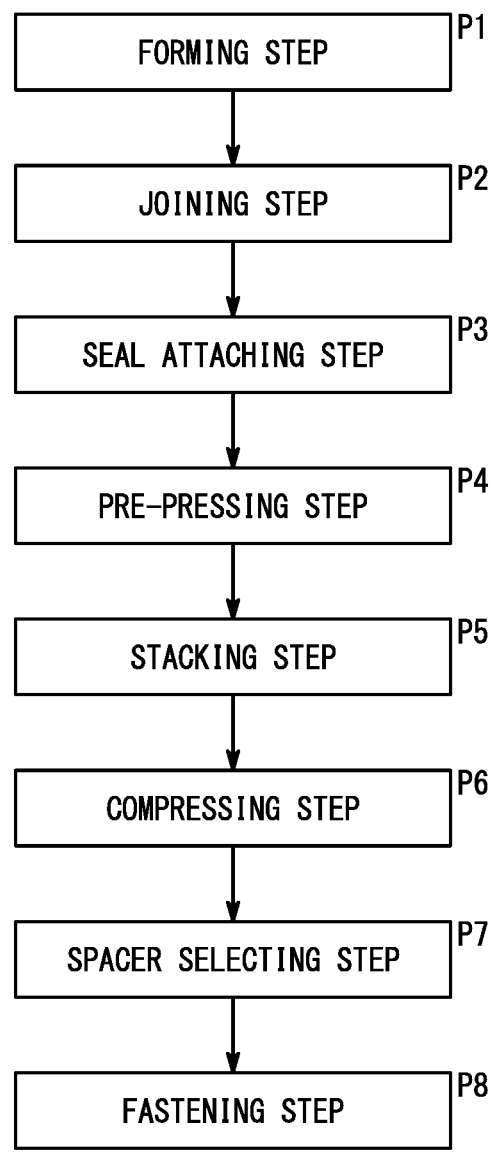
FIG. 4 is a flowchart illustrating a procedure of a method of producing a fuel cell stack.

An example of a method of producing the fuel cell stack will be described below. As shown in FIG. 4, the method of producing the fuel cell stack 10 includes a forming step P1, a joining step P2, a seal attaching step P3, a pre-pressing step P4, a stacking step P5, a compressing step P6, a spacer selecting step P7, and a fastening step P8.

The forming step P1 is a step of forming the separator plates. In the forming step P1, for example, the plates are pressed at a predetermined pressure to form the separator plates. A formed separator plate may be handled as the first separator plate 46. In this case, the bead 52a is formed in the forming step P1. Also, A formed separator plate may be handled as the second separator plate 48. In this case, the bead portion 52b is formed in the forming step P1.

The joining step P2 is a step of joining two separator plates (the first separator plate 46 and the second separator plate 48). In the joining step P2, the first separator plate 46 and the second separator plate 48 are joined to each other by welding or the like in a state where the coolant side surface 46b of the first separator plate 46 and the coolant side surface 48b of the second separator plate 48 face each other. In the joining step P2, one sheet of separator 28 is obtained.

Figure 5:
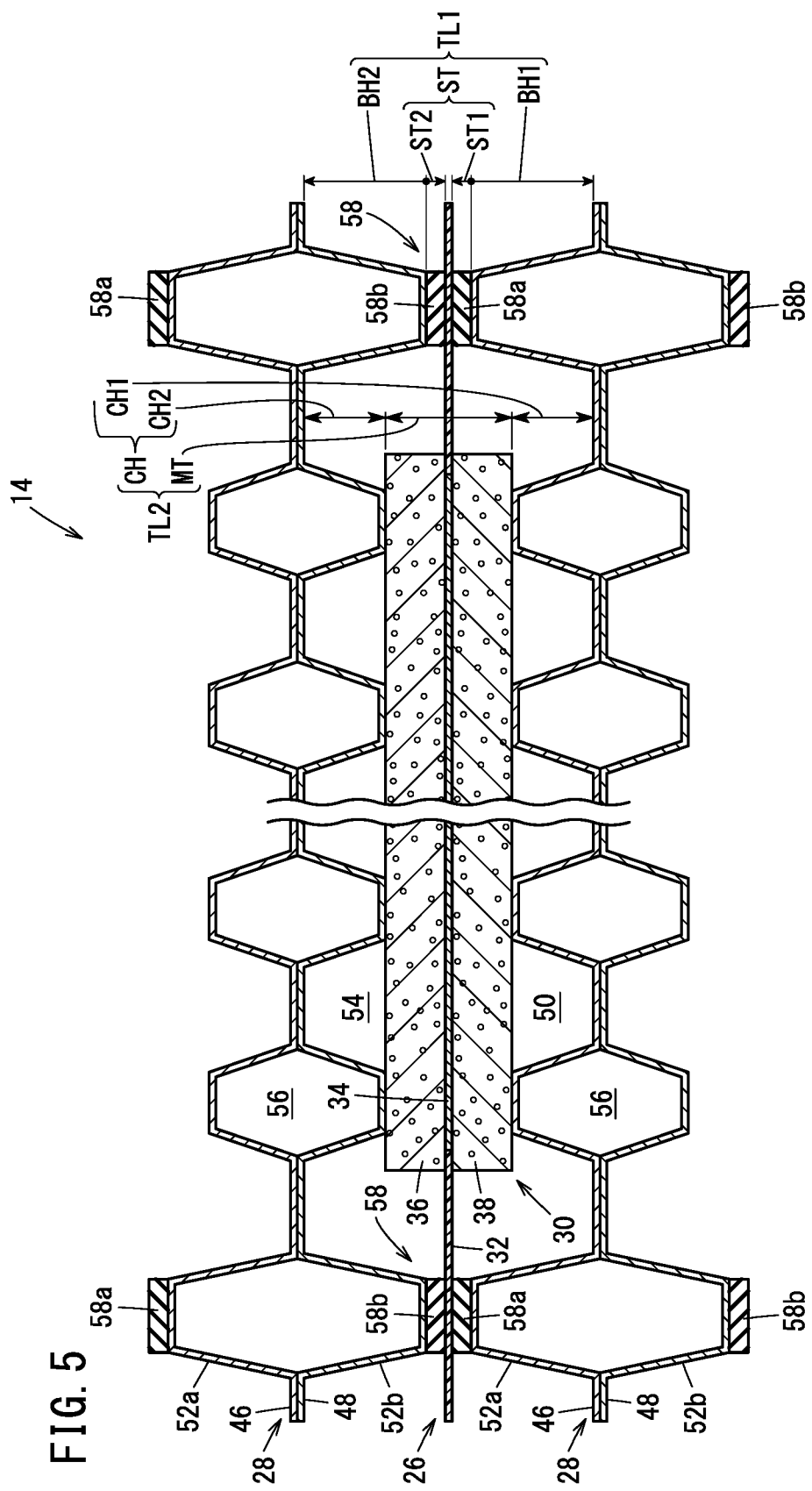
FIG. 5 is a view illustrating the relationship among the thicknesses of a seal member, a bead, and a membrane electrode assembly.

The seal attaching step P3 is a step of attaching the seal member 58. As shown in FIG. 5, in the seal attaching step P3, the thickness ST of the seal member 58 is set such that the first total length TL1 is equal to or less than the second total length TL2.

The first total length TL1 corresponds to the sum of the thickness ST of the seal member 58, the height BH1 of the bead 52a, and the height BH2 of the bead 52b in the stacking direction of the power generation cells 14. The second total length TL2 corresponds to the sum of the thickness MT of the membrane electrode assembly 30 and the heights CH of the fluid flow field portions of the power generation cells 14 in the stacking direction. The thickness ST of the seal member 58 is the sum of the thickness ST1 of the seal member 58a and the thickness ST2 of the seal member 58b. The height CH of the fluid flow field portions is the sum of the height CH1 of the oxygen-containing gas flow field portion 50 and the height CH2 of the fuel gas flow field portion 54.

In the seal attaching step P3, the seal member 58a of the selected seal member 58 is attached to the top of the bead 52a by, for example, bonding. Further, the seal member 58b of the selected seal member 58 is attached to the top of the bead 52b by, for example, bonding.

The pre-pressing step P4 is a prepress step of the separators 28 to which the seal member 58 has been attached. In the pre-pressing step P4, for example, the separator 28 to which the seal member 58 is attached is pressed. By the pre-pressing step P4, the height of the separator 28 to which the seal member 58 is attached is adjusted to a predetermined height.

Figure 6:
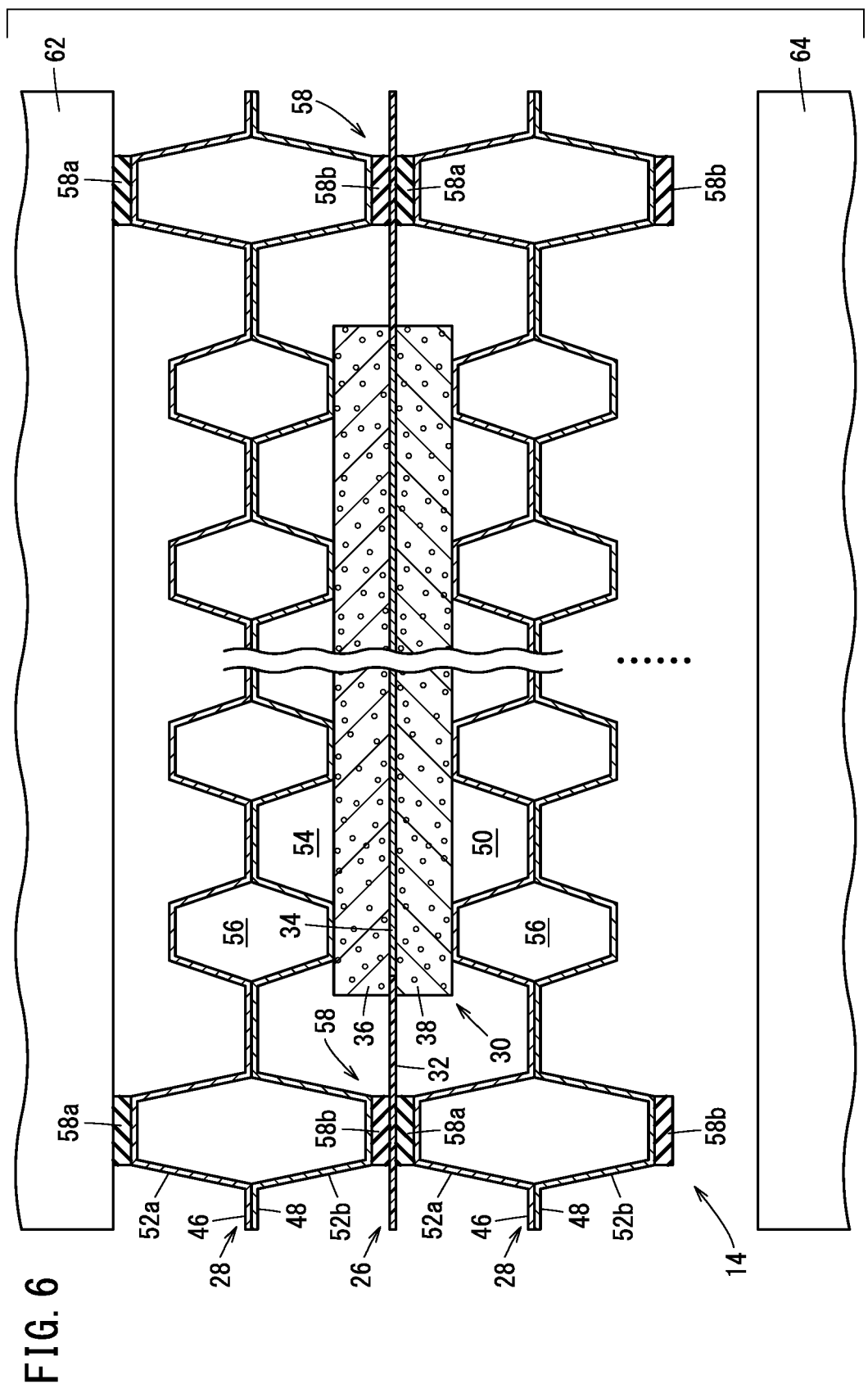
FIG. 6 is a view illustrating a state in which a plurality of power generation cells are stacked but not yet compressed.

The stacking step P5 is a step of stacking a plurality of power generation cells 14. In the stacking step P5, as shown in FIG. 6, the separator 28, the resin-framed MEA 26, and the separator 28, which are components of the power generation cell 14, are repeatedly stacked in this order.

Figure 7:
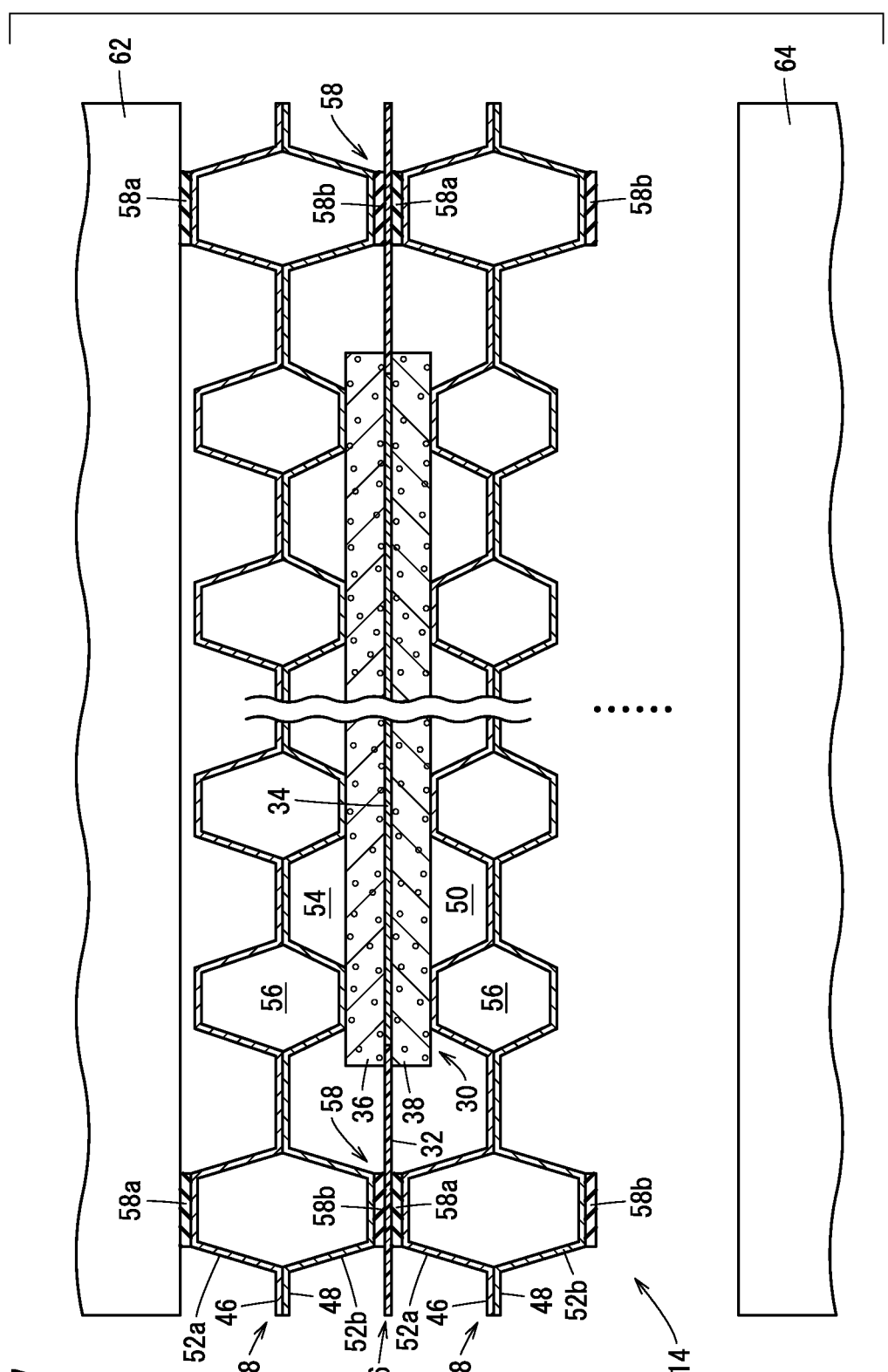
FIG. 7 is a view illustrating a state in which a compression load is applied to the plurality of stacked power generation cells.

The compressing step P6 is a step of applying a compression load to the power generation cells 14 stacked. As shown in FIG. 7, in the compressing step P6, a predetermined compression load is applied to the stacked power generation cells 14. By applying the compression load, the MEA 30, the beads 52a, 52b, and the seal member 58 are compressed. Thereafter, when the compression load is released, the power generation cell stack body 12 is obtained (see FIG. 1).

When the compression load is released, the beads 52a, 52b and the seal member 58 return to the state before the compression load is applied. On the other hand, the membrane electrode assembly 30 does not return to the state before the compression load is applied, but the thickness MT of the membrane electrode assembly 30 becomes slightly larger than that during the application of the compression load.

That is, in the compressing step P6, the compression load is applied so that the membrane electrode assembly 30 of the resin-framed MEA 26 is plastically deformed and the compression load does not exceed the elastic limit of the seal member 58. The elastic limit of the seal member 58 is greater than the elastic limit of the membrane electrode assembly 30. Therefore, the compression load can be applied without exceeding the elastic limit of the seal member 58 but plastically deforming the membrane electrode assembly 30. The elastic limit of the separators 28 (beads 52a, 52b) is greater than the elastic limit of the seal member 58. Therefore, if the compression load is applied to the seal member 58 without exceeding the elastic limit of the seal member 58, it also does not exceed the elastic limit of the separator 28.

The spacer selecting step P7 is a step of selecting a spacer. The spacer includes a pair of terminal plates 18a, 18b (FIG. 1), a pair of insulators 20a, 20b (FIG. 1), and a pair of end plates 22a, 22b (FIG. 1). In the spacer selecting step P7, the thicknesses, combinations, and the like of the components of the spacer are selected in accordance with the number of power generation cells 14 stacked and the like.

The fastening step P8 is a step of fastening the power generation cell stack body 12 to the spacer. In the fastening step P8, as shown in FIG. 1, at one end of the power generation cell stack body 12 in the stacking direction (end in a direction indicated by an arrow A1), a terminal plate 18a is provided. An insulator 20a is provided outside the terminal plate 18a, and an end plate 22a is provided outside the insulator 20a. At the other end of the power generation cell stack body 12 in the stacking direction (end in a direction indicated by an arrow A2), a terminal plate 18b is provided. An insulator 20b is provided outside the terminal plate 18b, and an end plate 22b is provided outside the insulator 20b. Further, a coupling bar 24 is disposed between the end plates 22a, 22b, and both ends of the coupling bar 24 are fixed to inner surfaces of the end plates 22a, 22b via bolts or the like. As a result, a fastening load in the stacking direction is applied to the power generation cell stack body 12. The fastening load may be the same as or different from the compression load applied in the compressing step P6.

Next, compression control in the compressing step P6 will be described. As shown in FIG. 8, a tool 60 used in the compressing step P6 includes a first pressing member 62, a second pressing member 64, and a controller 66. The controller 66 controls the first pressing member 62 and the second pressing member 64 to apply a compression load to the plurality of power generation cells 14 stacked between the first pressing member 62 and the second pressing member 64.

The controller 66 includes a processor and a memory 68. The memory 68 may include a volatile memory and a nonvolatile memory. Such a non-volatile memory is used as a storage memory, and programs, tables, and maps, etc., are stored in the non-volatile memory. At least a part of the memory 68 may be provided in a processor or the like.

In the present embodiment, a table indicating the correlation among sealing conditions, the number of power generation cells 14 stacked, and the compression load is stored in the memory 68. The sealing conditions include the type (elastic modulus) of the materials for the seal member 58 and the thickness ST of the seal member 58. The compression load is a compression load to be applied in the compressing step P6, and is set in advance based on predetermined setting conditions. The setting conditions include a threshold for the compression load not to exceed the elastic limit of the seal member 58. Further, the setting conditions include such a predetermined range that the average of the thicknesses MT of the membrane electrode assemblies 30 falls within the predetermined range after compression.

An input device 70 is connected to the controller 66. The input device 70 is a device for inputting input values such as sealing conditions and the number of power generation cells 14 stacked. Examples of the input device 70 include a keyboard, a touch panel, and the like. The controller 66 retrieves the sealing conditions and the number of power generation cells 14 stacked that are the same as or most approximate to the input values input from the input device 70 from the table stored in the memory 68. In this case, the controller 66 applies, to the plurality of power generation cells 14 stacked between the first pressing member 62 and the second pressing member 64, a compression load correlated with the retrieved sealing conditions and the number of power generation cells 14 stacked.

Therefore, in the compressing step P6, the compression load is applied so that the membrane electrode assembly 30 of the resin-framed MEA 26 is plastically deformed, without exceeding the elastic limit of the seal member 58. In this manner, the average of the thicknesses MT of the membrane electrode assemblies 30 of power generation cells 14 comes to fall within the predetermined range. As a result, it is possible to suppress an increase in the variation in the thicknesses MT of most membrane electrode assemblies 30.

The present invention is not limited to the embodiments described above, and various modifications can be made thereto without departing from the essence and gist of the present invention as set forth in the appended claims.

For example, the separator 28 may not be formed by joining the first separator plate 46 and the second separator plate 48 together. The separator 28 may be formed by one metal plate (bipolar plate).

Next, the invention and effects understood from the above embodiments will be described below. It should be noted that, for ease of understanding, constituent elements are labelled with the reference numerals of those used in the embodiments, but the present invention is not limited to such constituent elements labelled with the reference numerals.

In the present invention (1), there is provided a method of producing the fuel cell stack (10), comprising: the stacking step (P5) of stacking a plurality of power generation cells (14) each including the membrane electrode assembly (30), the pair of separator plates (46, 48) sandwiching the membrane electrode assembly, and the seal member (58); and compressing step (P6) of applying a compression load to the plurality of power generation cells stacked in the stacking step, wherein the separator plates respectively comprise fluid flow field portions (50, 54) facing the membrane electrode assembly and configured to allow fluids to flow in a surface direction of the separator plates and beads (52a, 52b) surrounding the fluid flow fields and protruding at portions outside the membrane electrode assembly in a thickness direction of the separator plates, the seal member is provided between the beads of the pair of separator plates, an elastic limit of the seal member is greater than an elastic limit of the membrane electrode assembly, and in the compressing step, the compression load is applied in a manner that the membrane electrode assembly is plastically deformed, without exceeding the elastic limit of the seal member.

In this manner, it is possible to suppress variation in thickness of the membrane electrode assemblies of respective power generation cells from increasing. As a result, it is possible to suppress decrease in power generation efficiency, thereby contributing to energy efficiency.

In the present invention (2), there is provided the method of producing the fuel cell stack, further comprising the seal attaching step (P3) of attaching seal member to tops of the beads, as a preceding step of the stacking step, wherein in the seal attaching step, a selection may be made in a manner that the seal member has such a thickness that a first total length (TL1) of a sum of the thickness (ST) of the seal member and heights of the beads (BH1, BH2) is equal to or smaller than a second total length (TL2) of a sum of a thickness (MT) of the membrane electrode assembly and heights (CH) of the fluid flow field portions.

Thus, the thickness of the membrane electrode assembly of each power generation cell can be controlled within an allowable range by compression. As a result, the variation in the thickness among the membrane electrode assemblies of the power generation cells can be reduced.

The invention claimed is:

1. A method of producing a fuel cell stack, comprising:
a stacking step of stacking a plurality of power generation cells each including a membrane electrode assembly, a pair of separator plates sandwiching the membrane electrode assembly, and a seal member; and
a compressing step of applying a compression load to the plurality of power generation cells stacked in the stacking step,
wherein the separator plates comprise:
fluid flow field portions facing the membrane electrode assembly and configured to allow fluids to flow in a surface direction of the separator plates; and
beads surrounding the fluid flow field portions and protruding at portions outside the membrane electrode assembly in a thickness direction of the separator plates,
the seal member is provided between the beads of the pair of separator plates,
an elastic limit of the seal member is greater than an elastic limit of the membrane electrode assembly, and
in the compressing step, the compression load is applied in a manner that the membrane electrode assembly is plastically deformed, without exceeding the elastic limit of the seal member.

2. The method of producing the fuel cell stack according to claim 1, further comprising:
a seal attaching step of attaching the seal member to tops of the beads, as a preceding step of the stacking step,
wherein in the seal attaching step, a selection is made in a manner that the seal member has a thickness that a first total length of a sum of a thickness of the seal member and heights of the beads is equal to or smaller than a second total length of a sum of a thickness of the membrane electrode assembly and heights of the fluid flow field portions.

* * * * *